United States Patent Office 2,693,046
Patented Nov. 2, 1954

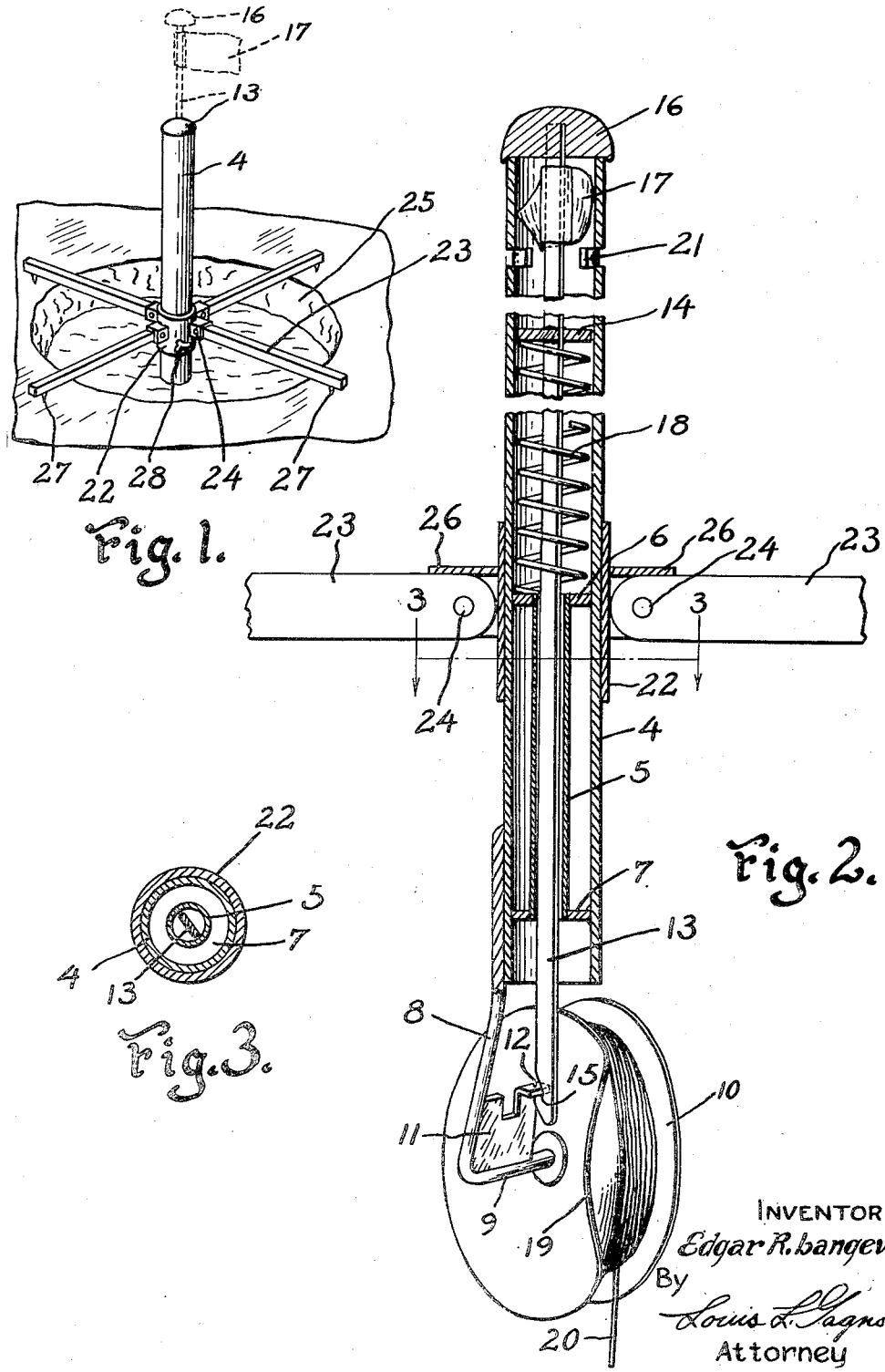

2,693,046

DEVICE FOR CATCHING FISH

Edgar R. Langevin, Southbridge, Mass.

Application June 28, 1951, Serial No. 234,041

3 Claims. (Cl. 43—17)

This invention relates to improvements in devices employed in catching fish and relates to the provision of a simple, novel, compact and efficient device adapted particularly for use in set-line type fishing through ice.

Fishing of the above character is a winter sport carried out by cutting a plurality of holes through the ice of a lake or pond and setting up at each hole what is commonly known as a tilt. Tilts, in most instances, embody a support having a reel of fish line thereon with a baited hook at the free end which is extended into the water through the hole and having a section of the line attached to some sort of a signalling device by which the fisherman can determine when a fish strikes and is on the line.

Several such tilts have been devised in the past but have proven unsatisfactory either because they were too complicated and costly to buy or failed to operate after having been in set position of use for a considerable length of time.

One of the major difficulties has been that, in most instances, the reel was attached to the support above the water level and when the temperature was considerably low, the water in the hole would soon freeze over, sealing in the line and preventing the operation of signalling device when a fish struck. Some attempts have been made to overcome this difficulty by placing the reel below the water level but such devices have proven unsatisfactory because of the failure of the signalling device to operate particularly on a cold, drizzly day when moisture would accumulate on the parts of the signalling device, freeze and render the device inoperative. The major difficulty with such devices is that they required constant attention and even then were the cause of the loss of many fish.

One of the principal objects, therefore, of the present invention is to overcome the above difficulties by providing a simple, novel and inexpensive device of the above character which will require practically no attention and which will operate efficiently and faithfully under all conditions of use.

Another object is to provide a device of the above character which is compact in construction, light in weight, and easy to carry and which has no exposed parts susceptible to being damaged to the extent of being rendered inoperative, as for example, when stored in the compartment of a motor vehicle or the like and with other fishing equipment.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described as the preferred form only is given by way of illustration.

Referring to the drawings:

Fig. 1 is a diagrammatic perspective view of the device embodying the invention and illustrating its use;

Fig. 2 is an enlarged longitudinal sectional view of the device illustrated in Fig. 1; and Fig. 3 is a cross-sectional view taken as on line 3—3 of Fig. 2.

Referring to the drawings wherein like characters of reference designate like parts throughout the several views, the device embodying the invention comprises a main relatively long tubular member 4 having, adjacent one end thereof, a short tubular member 5 of a smaller diameter secured inwardly thereof by spaced washer-like members 6 and 7. The washer-like members 6 and 7 each have a central opening in which the respective ends of the tubular member 5 are secured as by solder or other means. The said washer-like members are secured throughout their periphery to the inner sidewalls of the main tubular member 4 by solder or the like or may be held therein by a press fit or other means.

To the outer sidewall of the lower end of the main tubular member 4 there is secured, by solder or the like, a bracket 8 having an angled portion 9 on which a reel 10 is pivotally attached. The reel 10 is held on the angled portion 9 by a washer and nut or other suitable means, not shown, and secured to the free end of said portion 9 which is provided with threads or the like to receive the nut or other means.

A plate 11 having an angled lip portion 12 is secured to the bracket 8 and angled portion 9 by solder or other suitable means.

A bar-like member 13 having a disc 14 secured thereto intermediate its ends is placed inwardly of the inner tubular member 5. The said bar-like member 13 is provided at its lower end with a notched portion 15 adapted to be latched with the angled portion 12 and at its upper end is provided with a cap member 16 and a flag member 17 beneath said cap member.

Surrounding the bar-like member 13 between the washer-like member 6 and the disc 14 carried by said bar-like member is a coil spring 18. The said spring 18, when the notched portion 15 is in attached relation with the angled lip 12, is depressed and adapted to retain the parts in said relation. The length of the bar-like member is so controlled that when held in this position, the cap 16 will fit snugly in overlying relation with the top of the main tubular member 4.

The reel 10 is provided with a cam portion 19 angled in a sidewise direction an amount which is such that when the line 20 is drawn from the reel, as for example, when a fish strikes, the cam portion will force the notched portion 15 out of connected relation and free from the lip 12. This releases the coil spring 18 which, due to its resilient pressure on the disc 14, will force the bar-like member 13 upwardly and simultaneously force the cap 16 upwardly and expose the flag 17, as shown by the dash lines in Fig. 1.

Suitable stop members such as lip portions 21 struck inwardly of the sidewalls of the main tubular member 4 limit the upward movement of the bar-like member 13. The extent of the upward movement is so limited that the lower end of the bar-like member 13 does not move outwardly of the inner tubular member 5.

To support the device in position of use, the tubular member 4 is provided with a sleeve 22 which is slidable longitudinally thereof. The sleeve has a plurality of foot members 23 pivotally attached thereto, as illustrated at 24, and which may be extended, as shown in Fig. 1, to straddle the opening or hole 25 cut in the ice. The members 23 are limited in their upward movement by the stop walls 26 formed on the members to which they are pivotally connected.

The foot members may or may not be provided with barbs 27 for firmly anchoring them in position on the ice as desired. When in adjusted position wherein the reel, line and associated parts are beneath the water level by an amount sufficient so as not to be effected by surface freezing, the sleeve 22 is locked in adjusted position by a lock nut or other suitable means 28.

When the device is put to use, the end of the line 20 on which a baited hook is attached is extended into the water through the hole 25 in the ice. The notched end 15 of the bar-like member 13 is positioned in latched relation with the angled lip 12. When in this position, the cap 16 fits relatively snugly over the end of the main tubular member 4 with the signalling flag 17 positioned within said tube.

The foot members 23 are then extended to straddle the hole 25 and the sleeve is locked by the lock nut 28 in a position which is such that the reel 10, line 20 and interfitting notched portion 15 with the lip 12 will all be in the water at a depth below the freezing level.

It is apparent that the cap 16 seals the upper end of the tube and that if it should be a cold drizzly day, no water or moisture can get inwardly of the main tubular member 4 and freeze and render the internal parts inoperative.

When a fish strikes, it will cause the reel to rotate whereby the cam member 19 will force the latched end 15 free from the lip 12 and permit the coil spring to force the cap 16 and signalling flag 17 upwardly.

This will immediately signal the fisherman that a fish has struck and draw his attention to the line. Continued fishing is accomplished by repeating the above procedure. It is particularly pointed out that substantially no attention of the device is required when in use as there are no exposed parts susceptible to being rendered inoperative by freezing.

When it is desired to store the devices, the line is completely wound on the reel 10, the notched end 15 is latched with the lip 12 and the sleeve 22 is slid upwardly of the main tubular member 4 to a position wherein the foot members 23 can be folded in close compact relation with said tubular member. The device may be easily stored and there are no exposed parts susceptible to damage.

From the foregoing description, it will be seen that simple, efficient and economical means have been provided for accomplishing all of the objects and advantages of the invention.

Having described my invention, I claim:

1. In a fishing tackle for ice fishing, the combination of a main tubular member of a given diameter, a smaller tubular member of a diameter less than the inner diameter of the main tubular member rigidly supported in the lower portion and in spaced substantially concentric relation with said main tubular member, a bar-like member having a signal flag adjacent its upper end and a lower hook-shaped end portion, said bar-like member extending in a direction longitudinally of the main tubular member and slidably fitting within said smaller tubular member and having a stop portion at a location thereon spaced above the upper end of the smaller tubular member, a spring internally of the main tubular member between said upper end of the smaller tubular member and the stop portion on said bar-like member, a depending bracket on the lower end of the main tubular member, a reel rotatably supported on the bracket, a member on said bracket having a relatively narrow angled lip portion with which the hook-shaped end of the bar-like member is adapted to be latched against the resilient action of the spring to retain the signal flag internally of the main tubular member, said reel having a cam portion with a curved contour on the side thereof toward the angled lip portion which, when the reel is rotated by a striking fish, will cause said hook-shaped end to be moved sidewise an amount sufficient to be released from the angled lip portion to permit the spring to move the bar-like member upwardly an amount sufficient to expose the signal flag, and stop means internally of said main tubular member for engagement by the stop portion on the bar-like member for limiting the upward movement of said bar-like member, said smaller tubular member being of a length sufficient to permit the full range of upward movement of the bar-like member without having the lower end of the bar-like member move outwardly of said smaller tubular member.

2. In a fishing tackle for ice fishing, the combination of a main tubular member of a given diameter, a smaller tubular member of a diameter less than half the diameter of the main tubular member rigidly supported in spaced substantially concentric relation with said main tubular member by fixed annular spacer members, a bar-like member having a signal flag adjacent its upper end and a lower notched end portion, said bar-like member extending in a direction longitudinally of the main tubular member and slidably fitting within said smaller tubular member and having a flange-like stop portion at a location thereon spaced above the upper of said spacer members, a coil spring surrounding said bar-like member internally of the main tubular member between said upper spacer member and the flange-like stop portion on said bar-like member, a bracket adjacent the lower end of the main tubular member, a reel rotatably supported on the bracket, a plate on said bracket having a relatively narrow angled lip portion with which the notched end of the bar-like member is adapted to be latched by compression of the coil spring to retain the signal flag internally of the upper portion of the main tubular member, said reel having a cam portion on the side thereof toward the angled lip portion which, when the reel is rotated by a striking fish, will cause said notched end to be moved sidewise an amount sufficient to be released from the angled lip portion to permit the coil spring to move the bar-like member upwardly an amount sufficient to expose the signal flag, and stop means internally of said main tubular member for engagement by the flange-like stop portion on the bar-like member for limiting the upward movement of said bar-like member, said smaller tubular member being of a length sufficient to permit the full range of upward movement of the bar-like member without having the lower end of said bar-like member move outwardly of said smaller tubular member.

3. In a fishing tackle for ice fishing, the combination of a main tubular member of a given length and diameter, a relatively short smaller tubular member of a diameter less than half the diameter of the main tubular member rigidly supported in spaced substantially concentric relation with said main tubular member by rigidly connected annular spacer members, a bar-like member having a signal flag adjacent its upper end and a lower hook-shaped end portion, said bar-like member extending in a direction longitudinally of the main tubular member and slidably fitting within said smaller tubular member and having a stop portion at a location thereon spaced above the upper of said spacer members, a coil spring surrounding said bar-like member internally of the main tubular member between said upper spacer member and the flange-like stop portion on said bar-like member, a depending bracket on the lower end of the main tubular member having a portion substantially right-angularly disposed relative to the longitudinal axis of the main tubular portion and extending in a direction transversely thereof, a reel rotatably mounted on said right-angular portion, said bracket having a relatively narrow angled lip portion thereon adjacent one side of the reel with which the hook-shaped end of the bar-like member is adapted to be latched by compression of the coil spring to retain the signal flag internally of the upper portion of the main tubular member, said reel having a cam portion with a gradually sloping curved contour on the side thereof toward the angled lip portion which, when the reel is rotated by a striking fish, will cause said hook-shaped end to be moved sidewise an amount sufficient to be released from the angled lip portion to permit the coil spring to move the bar-like member upwardly an amount sufficient to expose the signal flag, and stop means internally of said main tubular member for engagement by the stop portion on the bar-like member for limiting the upward movement of said bar-like member, said smaller tubular member being of a controlled length sufficient to permit the full range of upward movement of the bar-like member without having the lower end of said bar-like member move outwardly of said smaller tubular member.

References Cited in the file of this patent

UNITED STATES PATENTS

| Number | Name | Date |
|---|---|---|
| 253,456 | Whitcomb | Feb. 7, 1882 |
| 589,640 | Cartier | Sept. 7, 1897 |
| 623,290 | Schlaebitz | Apr. 18, 1899 |
| 2,114,529 | Goodhue | Apr. 19, 1938 |
| 2,439,451 | Clark | Apr. 13, 1948 |
| 2,448,346 | Baugh et al. | Aug. 31, 1948 |

FOREIGN PATENTS

| Number | Country | Date |
|---|---|---|
| 355,711 | France | Sept. 9, 1905 |